United States Patent
Kamidaki et al.

(10) Patent No.: US 9,859,032 B2
(45) Date of Patent: Jan. 2, 2018

(54) ELECTRIC WIRE FOR REDUCING AC RESISTANCE TO BE EQUAL TO OR LESS THAN COPPER WIRE

(71) Applicant: FUJIKURA LTD., Tokyo (JP)

(72) Inventors: Chihiro Kamidaki, Sakura (JP); Ning Guan, Chiba (JP); Yasunobu Hori, Urayasu (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/777,964

(22) PCT Filed: Mar. 17, 2014

(86) PCT No.: PCT/JP2014/057129
§ 371 (c)(1),
(2) Date: Sep. 17, 2015

(87) PCT Pub. No.: WO2014/148430
PCT Pub. Date: Sep. 25, 2014

(65) Prior Publication Data
US 2016/0276051 A1    Sep. 22, 2016

(30) Foreign Application Priority Data
Mar. 18, 2013    (JP) .................................. 2013-055394

(51) Int. Cl.
*H01B 1/02* (2006.01)
*H01B 7/30* (2006.01)
(Continued)

(52) U.S. Cl.
CPC .............. *H01B 1/026* (2013.01); *H01B 1/02* (2013.01); *H01B 7/30* (2013.01); *H01F 5/00* (2013.01);
(Continued)

(58) Field of Classification Search
CPC ... H01B 5/02; H01B 7/30; H01B 7/00; H01B 1/02; H01B 9/02; H01B 5/00;
(Continued)

(56) References Cited

U.S. PATENT DOCUMENTS 3,096,577 A * 7/1963 Carlson ..................... B21C 1/00
228/118
3,573,676 A * 4/1971 Mayer .................... H01B 11/12
178/45

(Continued)

FOREIGN PATENT DOCUMENTS

CN    201075311 Y    6/2008
EP    2608222    *    7/2011
(Continued)

OTHER PUBLICATIONS

Copper Clad Aluminum Fine Wire in Coaxial Cable John C. Fan, Manager, Research & Development Copper Clad Aluminum Wire Frank A. Spexarth, Manager, Communication Industry Products 1970.*
(Continued)

*Primary Examiner* — Michael F McAllister
(74) *Attorney, Agent, or Firm* — Sughrue Mion, PLLC (57) ABSTRACT

An electric wire capable of reducing an AC resistance equal to or less than the copper wire. In the electric wire in a single layered structure having a first layer of a substance having lower conductivity than copper, a radius of the wire is less than a skin depth, and an alternating current resistance value of the wire at a frequency used in the wire is greater than or equal to a sum of a direct current resistance value of the wire and a direct current resistance value of a copper wire having a same shape and a same outer diameter as the wire, and less than or equal to an alternating current resistance of the copper wire.

6 Claims, 6 Drawing Sheets

(51) Int. Cl.
*H01F 5/00* (2006.01)
*H02K 3/02* (2006.01)
*H05B 6/36* (2006.01)
*H01F 27/28* (2006.01)

(52) U.S. Cl.
CPC ........... *H01F 27/2823* (2013.01); *H02K 3/02* (2013.01); *H05B 6/36* (2013.01)

(58) Field of Classification Search
CPC .......... H01F 27/28; H01F 41/12; H01F 27/32; H01P 3/10; H02K 3/02; H02K 9/0098
USPC ............................ 174/24, 126.2; 318/400.26
See application file for complete search history.

(56) References Cited

U.S. PATENT DOCUMENTS

| | | | | |
|---|---|---|---|---|
| 4,079,192 A | * | 3/1978 | Josse | H01B 7/30 174/113 R |
| 4,256,945 A | * | 3/1981 | Carter | H05B 3/12 219/229 |
| 5,574,260 A | * | 11/1996 | Broomall | H01B 1/02 174/102 R |
| 8,866,019 B2 | * | 10/2014 | Shinmoto | G06F 17/50 174/126.1 |
| 2009/0178827 A1 | * | 7/2009 | Mahlandt | H01B 11/1817 174/126.1 |
| 2012/0125651 A1 | | 5/2012 | Pearson | |
| 2013/0234637 A1 | | 9/2013 | Shinmoto et al. | |

FOREIGN PATENT DOCUMENTS

| | | | |
|---|---|---|---|
| JP | 62-76216 A | | 4/1987 |
| JP | 2002-150633 A | | 5/2002 |
| JP | 2005-108654 A | | 4/2005 |
| JP | 2009-129550 | * | 6/2009 |
| JP | 2009-129550 A | | 6/2009 |
| JP | 2012-169288 | * | 9/2012 |
| WO | 2006/046358 A1 | | 5/2006 |
| WO | 2012/023378 A1 | | 2/2012 |

OTHER PUBLICATIONS

Aluminum Windings and Other Strategies for High-Frequency Magnetics Design in an Era of High Copper and Energy Costs C. R. Sullivan Found in IEEE Applied Power Electronics Conference, Feb. 2007, pp. 78-84.*
Impact of Size Effects and Anomalous Skin Effect on Metallic Wires as GSI Interconnects A Thesis Presented to the Academic Faculty by Reza Sarvari Georgia Institute of Technology Dec. 2008.*
Aluminum Windings and Other Strategies for High-Frequency Magnetics Design in an Era of High Copper and Energy Costs Charles R. Sullivan IEEE Transactions on Power Electronics, vol. 23, No. 4, Jul. 2008.*
AC Resistance of Copper Clad Aluminum Wires Ning Guan et al. Proceedings of ISAP2012, Nagoya, Japan.*
Charles R. Sullivan, "Computationally Efficient Winding Loss Calculation with Multiple Windings, Arbitrary Waveforms, and Two-Dimensional or Three-Dimensional Field Geometry", IEEE Transactions on Power Electronics, Jan. 2001, pp. 142-150, vol. 16, No. 1.
Charles R. Sullivan, "Aluminum Windings and Other Strategies for High-Frequency Magnetics Design in an Era of High Copper and Energy Costs", IEEE Transactions on Power Electronics, Jul. 2008, pp. 2044-2051, vol. 23, No. 4.
International Search Report for PCT/JP2014/057129 dated Jun. 17, 2014.
Communication dated Dec. 8, 2016 from the European Patent Office in counterpart Application No. 14770299.7.
Communication dated Sep. 13, 2016, from the Japanese Patent Office in counterpart Japanese application No. 2015-506766.
Communication dated May 31, 2016 from the State Intellectual Property Office of the P.R.C. issued in corresponding Application No. 201480016903.7.

* cited by examiner

ELECTRIC WIRE FOR REDUCING AC RESISTANCE TO BE EQUAL TO OR LESS THAN COPPER WIRE

CROSS REFERENCE TO RELATED APPLICATIONS

This application is a National Stage of International Application No. PCT/JP2014/057129 filed Mar. 17, 2014, claiming priority based on Japanese Patent Application No. 2013-055394, filed Mar. 18, 2013, the contents of all of which are incorporated herein by reference in their entirety.

TECHNICAL FIELD

The present invention relates to an electric wire and a coil used in high frequency.

BACKGROUND ART

In winding wires and feeding cables of devices for energizing the high frequency current (transformers, motors, reactors, induction heating devices, magnetic head devices and the like), usually copper is used as a wire material owing to the reasons, such as higher electrical conductivity, availability, and the like. In these devices, the eddy current loss occurs in the conductor due to the magnetic field generated by the high frequency current, and it follows that the alternating current (AC) resistance (also referred to as "high frequency resistance") increases (the skin effect and the proximity effect increase) and thus, increases in the heat generation and power consumption occurs.

In general, for suppressing the increases of the skin effect and proximity effect, countermeasure is made by thinning an outer diameter of the electric wire and employing a litz wire with insulating coating (for example, refer to Patent Documents 1 to 5).

However, in the technical means of the prior arts, it becomes a common knowledge that it is difficult to work for removing the insulating layer in soldering process for connection, and there is a limit for thinning the outer diameter due to increase in a number of element wires. Moreover, since effective countermeasure has not been found for the wire diameter where the proximity effect is overwhelmingly dominant more than the skin effect, it becomes a common knowledge that there is a limit to the characteristic obtained by the countermeasure to thin the outer diameter. In addition, although the examples of countermeasure are presented in Patent Documents 1 to 5, since any of them is a kind of idea and lacks detail or specifics, it cannot be a valid countermeasure.

Additionally, it is known to use the electric wire having a higher volume resistivity than the copper wire in a specific frequency range where the high frequency resistance is equal to or less than the copper wire, by utilizing the fact that the proximity effect loss in the electric wire having the higher volume resistivity than the copper wire is smaller than copper wire (for example, refer to Patent Document 6). Further, formulation of the resistance due to the proximity effect is being studied (for example, refer to Non-Patent Documents 1 and 2).

PRIOR ART DOCUMENT

Patent Document

[Patent Document 1] JP 2009-129550
[Patent Document 2] JP S62-76216
[Patent Document 3] JP 2005-108654
[Patent Document 4] WO 2006/046358
[Patent Document 5] JP 2002-150633
[Patent Document 6] WO 2012/023378

Non-Patent Document

[Non-Patent Document 1] C. R. Sullivan, "Computationally Efficient Winding Loss Calculation with Multiple Windings, Arbitrary Waveforms, and Two-Dimensional or Three-Dimensional Field", IEEE Trans. on Power Electronics, vol. 16, No. 1, pp. 142-150, 2001
[Non-Patent Document 2] C. R. Sullivan, "Aluminum Windings and Other Strategies for High-Frequency Magnetics Design in an Era of High Copper and Energy Costs", IEEE Trans. on Power Electronics, vol. 23, issue 4, pp. 2044-2051, 2008

DISCLOSURE OF INVENTION

However, in Patent Document 6, although the frequency range where the AC resistance is equal to or less than the copper wire is defined, the value of the frequency itself is not defined. Therefore, when designing the electric wire or the coil, a determination whether the AC resistance can be equal to or less than the copper wire at a frequency to be used may be complicated, and in some cases, the design of the electric wire and the coil may be difficult.

In view of the above problems, an object of the present invention is to provide an electric wire and a coil capable of reducing the AC resistance equal to or less than the copper wire and being easily designed, and a design method of the electric wire capable of easily designing the electric wire.

An aspect of the present invention provides an electric wire including a single layered structure having a first layer of a substance having lower conductivity than copper, or including a double layered structure in which a second layer of copper is formed on a periphery of the first layer, wherein a radius of the electric wire is less than a skin depth, an alternating current resistance value of the electric wire at a frequency used in the electric wire is provided in excess of a sum of a value obtained by multiplying a direct current resistance value of the electric wire by a ratio of a cross-sectional area of the first layer and a cross-sectional area of the entire electric wire, and a direct current resistance value of a copper wire having a same shape and a same outer diameter as the electric wire.

Another aspect of the present invention provides a coil using an electric wire including a single layered structure having a first layer of a substance having lower conductivity than copper, or including a double layered structure in which a second layer of copper is formed on a periphery of the first layer, wherein a radius of the electric wire is less than a skin depth, an alternating current resistance value of the electric wire at a frequency used in the electric wire is provided in excess of a sum of a value obtained by multiplying a direct current resistance value of the electric wire by a ratio of a cross-sectional area of the first layer and a cross-sectional area of the entire electric wire, and a direct current resistance value of a copper wire having a same shape and a same outer diameter as the electric wire.

Still another aspect of the present invention provides a method for designing an electric wire including using a wire material including a single layered structure having a first layer of a substance having lower conductivity than copper, or including a double-layered structure in which a second layer of copper is formed on a periphery of the first layer;

designing the electric wire so that a radius of the electric wire is smaller than a skin depth thereof, and an alternating current resistance value of the electric wire at a frequency used in the electric wire is in excess of a sum of a value obtained by multiplying a direct current resistance value of the electric wire by a ratio of a cross-sectional area of the first layer and a cross-sectional area of the entire electric wire, and a direct current resistance value of a copper wire having a same shape and a same outer diameter as the electric wire.

According to the present invention, it is possible to provide an electric wire and a coil capable of reducing the AC resistance equal to or less than the copper wire and being easily designed, and a design method of the electric wire capable of easily designing the electric wire.

DESCRIPTION OF EMBODIMENTS

First and second embodiments of the present invention will be described with reference to the accompanying drawings. In the following description of the drawings, same or similar parts are given same or similar reference numerals. However, it is noted that the drawings are schematic and that the relationship between thickness and planar dimensions, the proportion of thicknesses of layers, and the like are different from real ones. Accordingly, specific thicknesses and dimensions should be determined with reference to the following description. It is certain that some portions have different dimensional relations and proportions between the drawings.

Also, the following embodiments show devices and methods to embody the technical idea of the invention by way of example. The technical ideas of the invention do not limit the materials, shapes, structures, arrangements, and the like of the constituent components to those described below. The technical idea of the invention can be variously changed within the scope of the claims.

First Embodiment

Electric Wire and Coil

Figure 1:
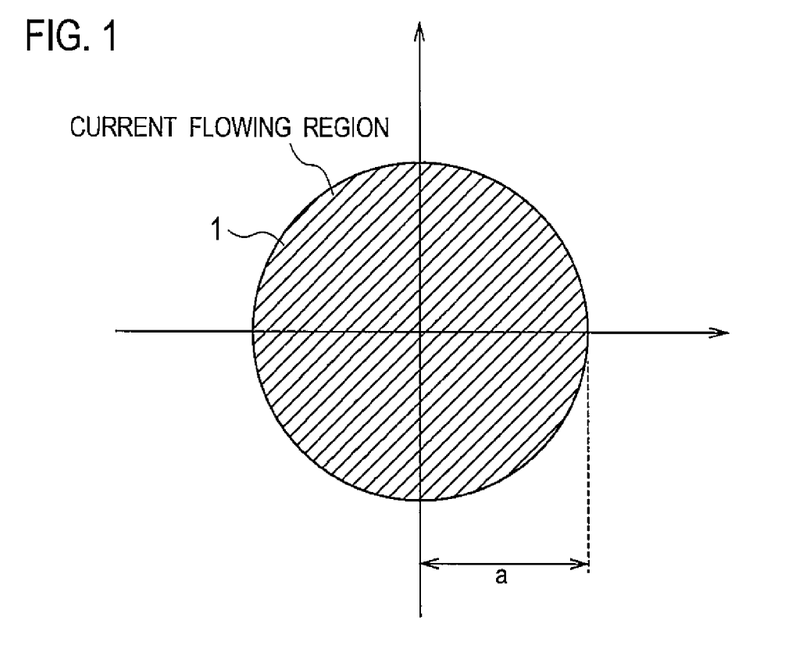
FIG. 1 is a cross-sectional view illustrating an example of an electric wire according to a first embodiment of the present invention.

An electric wire 1 according to a first embodiment of the present invention, as shown in FIG. 1, is made of a wire material having lower conductivity than copper where a radius a of the electric wire 1 is smaller than a skin depth thereof, and an AC resistance value of the electric wire 1 at a frequency used in the electric wire 1 is provided in excess of a sum of a direct current (DC) resistance value of the electric wire 1 and a DC resistance value of the copper wire having the same shape and the same outer diameter as the electric wire 1.

Figure 2:
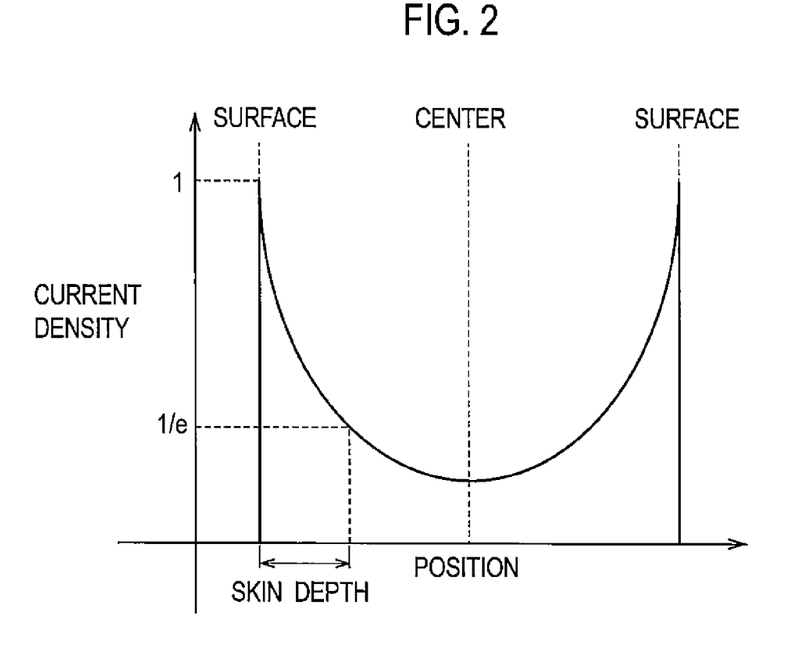
FIG. 2 is a graph for explaining a skin depth according to the embodiment of the present invention.

As shown in FIG. 2, when an AC current is flowing through a conductor, the current density is largest at a conductor surface, and the current density exponentially decreases in a direction from the conductor surface to the conductor center. This is called the skin effect. In this case, the depth of a current density value obtained by multiplying the current density at the conductor surface by "1/e" is defined as "skin depth". "e" is the base of natural logarithm, and 1/e is about 0.37. The higher the frequency of the AC current, the larger the current density at the conductor surface and the less the current density at the conductor center.

The frequency used in the electric wire 1 according to the first embodiment of the present invention may be set as appropriate according to the specification of each product, and is not particularly limited. For example, it may be about 1 kHz to about 1 MHz, or about 10 kHz to about 100 kHz. In the case of the induction heating (IH) cooking device, it may be about 20 kHz to about 100 kHz. It may be about 50 Hz to about 60 Hz in the case of the product that directly uses the utility frequency in Japan, United State, Europe, China, and the like.

The diameter of the electric wire 1 according to the first embodiment of the present invention is preferably about 0.05 mm to about 0.6 mm, and is not particularly limited. Copper alloy, such as brass, phosphor bronze, silicon bronze, copper-beryllium alloys, copper-nickel-silicon alloy and the like, may be used for the wire material constituting the electric wire 1. Among these, the brass is an alloy (Cu—Zn) containing copper (Cu) and zinc (Zn), and also may contain small amounts of elements other than copper and zinc. The silicon bronze is an alloy (Cu—Sn—Si) containing copper, tin (Sn) and silicon (Si), and also may contain small amounts of elements other than copper, tin and silicon. The phosphorus bronze (Cu—Sn—P) is an alloy containing copper, tin and phosphorus (P), and also may contain small amounts of elements other than copper, tin and phosphorus. These copper alloy wire may be subjected to tin, copper or chromium (Cr) plating. Moreover, the electric wire 1 may have a cylindrical shape, and also may have a various shape, such as a rectangular shape, and the like.

Furthermore, for the electric wire 1 according to the first embodiment of the present invention, a copper clad aluminum (CCA) wire in which copper (Cu) is uniformly coated on the outer circumference of an aluminum (Al) wire may be used. Overall diameter of the CCA wire, which is preferably about 0.05 mm to about 0.6 mm, and is not particularly limited. A cross-sectional area of the copper layer is greater than 0 and not more than 30% with respect to the cross-sectional area of the entire electric wire which includes the aluminum wire and the copper layer, preferably about 3% to about 15%, more preferably about 3% to about 10%, further more preferably about 3% to about 5%. As the ratio of the cross-sectional area of the copper layer to the entire electric wire is reduced, the AC resistance can be decreased. For the aluminum wire, for example, aluminum for electric use (EC aluminum) or aluminum alloy, such as Al—Mg—Si alloy (JIS6000 series), may be used.

In the conductor, such as the electric wire 1 and the like, eddy current may flow in the conductor by the magnetic flux in the conductor, and this eddy current may increase the AC resistance caused by a skin effect. In addition, eddy current may flow in the conductor by an external magnetic flux, and this eddy current may increase the AC resistance caused by a proximity effect.

According to Patent Document 6, the AC resistance $R_{ac}$ per unit length of the electric wire or coil can be expressed by the following equation (1).

$$R_{ac} = R_s + R_p \tag{1}$$

Here, $R_s$ is a resistance of an element wire per unit length includes the increase due to the skin effect, $R_p$ is a resistance of an element wire per unit length due to the proximity effect. Here, according to Patent Document 6, $R_s$ and $R_p$ are expressed by the following equation (2) and (3).

$$R_s = \Re\left[\frac{j\omega\mu_0}{2\pi ka} \cdot \frac{J_0(ka)}{J_0'(ka)}\right] \tag{2}$$

$$R_p = -\frac{4\pi}{\sigma}\alpha^2 \Re\left[ka\frac{J_1(ka)J_1'^*(ka)}{|J_0(ka)|^2}\right] \tag{3}$$

$$k^2 = -j\omega\mu_0\sigma \tag{4}$$

Here, j is the imaginary unit, it is the circular constant, $\omega$ is the angular frequency, $\mu_0$ is the permeability of vacuum, a is the radius of the element wire, $\Re$ is the real part of the complex, $J_n$ represents the first kind Bessel function of order n. Moreover, $\alpha$ is a coefficient representing the intensity of the magnetic field acting on the element wire.

Resistance of the coil or the electric wire is proportional to the length of the conductor forming the coil or the electric wire and inversely proportional to number of the element wires of the conductor constituting the coil or the electric wire. Thus, when the length of the conductor is l and a number of the element wires of the conductor is N, the AC resistance of the coil or the electric wire is represented by the following equation (5).

$$R_{ac} = (R_s + R_p) \times \frac{l}{N} \tag{5}$$

According to Patent Document 6, when the intensity of the magnetic field acting on each element wire of the electric wire and the coil is $H_i$, loss $P_L$ of the conductor per unit length due to the eddy current is expressed by the following equation (6).

$$P_L = -\frac{2\pi}{\sigma}H_i^2 \Re\left[ka\frac{J_1(ka)J_1'^*(ka)}{|J_0(ka)|^2}\right] \tag{6}$$

Thus, loss of the coil having the number of the element wires N, the number of turns T, and the length $l_i$ of the conductor of each turn is represented by the following equation (7).

$$\sum_{i=1}^{N \times T} l_i H_i^2 P_L \tag{7}$$

In addition, T=1 in case of the electric wire in which the number of turns is one. The energy loss is represented by one-half product of resistance and square of the current, from the expression (5), the loss due to the proximity effect is expressed by the following equation (8).

$$\frac{1}{2}(Ni_0)^2 R_p \frac{l}{N} \tag{8}$$

Here, $i_0$ is the current in the element wire. From the equations (7) and (8), a is expressed by the following equation (9).

$$\alpha = \sqrt{\frac{\sum_{i=1}^{N \times T} l_i H_i^2}{i_0^2 \sum_{i=1}^{N \times T} l_i}} \tag{9}$$

Here, by assuming a shape of the electric wire or coil, $H_i$ can be obtained by calculation using the finite element method, or calculation using the Ampere law, and the like.

Figure 3:
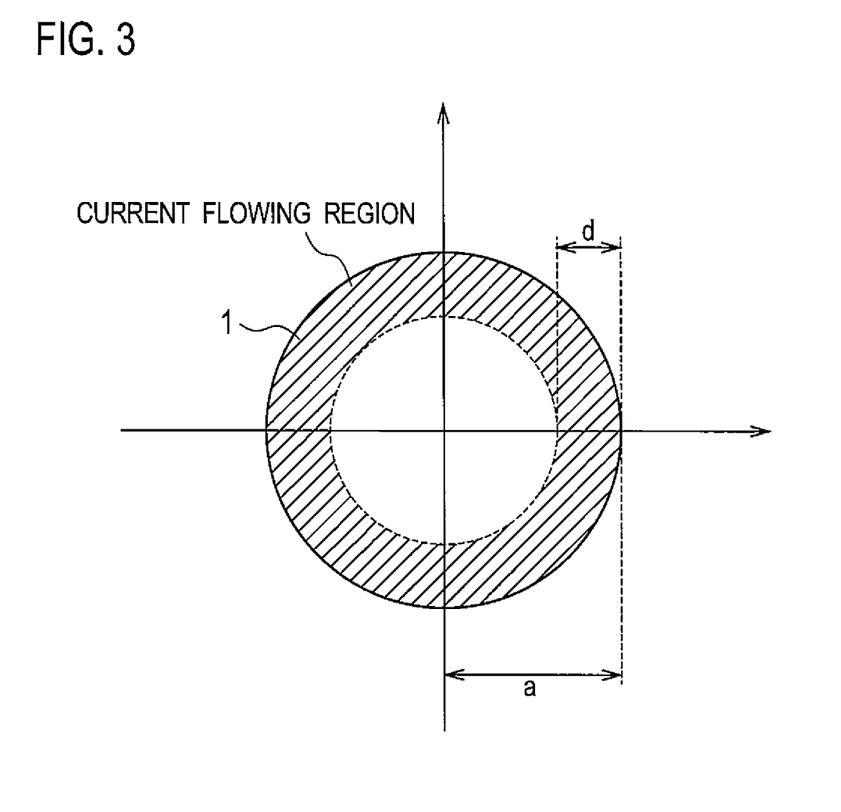
FIG. 3 is a cross-sectional view for explaining the skin effect of the electric wire.

When the frequency is sufficiently high, the skin effect becomes remarkable, and if the radius a of the electric wire 1 is greater than the skin depth d as shown in FIG. 3, the current of the element wire flows to concentrate within the skin depth d, as indicated by the shaded area in FIG. 3. On the contrary, in the first embodiment of the present invention, since the radius a of the electric wire 1 is less than the skin depth, as shown in FIG. 1, the skin effect may be sufficiently small, and the current in the element wire flows across the entire electric wire 1. Therefore, the proximity effect is dominant for the AC resistance of the electric wire 1 or the coil, and $R_s$ may be equal to the DC resistance and is expressed by the following equation (10). Also, according to Non-Patent Document 1, $P_L$ is expressed by the following equation (11).

$$R_s = \frac{1}{\sigma\pi a^2} \tag{10}$$

$$P_L = \frac{\sigma\pi a^4}{8}(\omega\mu_0 H_i)^2 \tag{11}$$

Thus, the AC resistances $R_{ac1}$, $R_{ac2}$ of the coil using two different types of wire materials having conductivity $\sigma_1$, $\sigma_2$, respectively, are expressed by the following equations (12), (13), respectively.

$$R_{ac1} = \left[\frac{1}{\sigma_1\pi a^2} + \alpha^2\frac{\sigma_1\pi a^4}{4}(\omega\mu_0)^2\right] \tag{12}$$

-continued $$R_{ac2} = \left[\frac{1}{\sigma_2 \pi a^2} + \alpha^2 \frac{\sigma_2 \pi a^4}{4}(\omega \mu_0)^2\right] \quad (13)$$

Here, assuming that the values of $R_{ac1}$, $R_{ac2}$ are equal, the following equation (14) is obtained.

$$R_{ac1} - R_{ac2} = \left[\frac{1}{\sigma_1 \pi a^2} - \frac{1}{\sigma_2 \pi a^2}\right] + \quad (14)$$

$$\left[\alpha^2 \frac{\sigma_1 \pi a^4}{4}(\omega \mu_0)^2 - \alpha^2 \frac{\sigma_2 \pi a^4}{4}(\omega \mu_0)^2\right]$$

$$= 0$$

The frequency $f_1$ and the AC resistance $R_1$ in this case are expressed by the following equations (15), (16), respectively.

$$f_1 = \sqrt{\frac{1}{\sigma_1 \sigma_2}} \frac{1}{\alpha \pi^2 a^3 \mu_0} \quad (15)$$

$$R_1 = \left(\frac{1}{\sigma_1 \pi a^2} + \frac{1}{\sigma_2 \pi a^2}\right) \times \frac{l}{N} \quad (16)$$

As mentioned above, when the AC resistances $R_{ac1}$, $R_{ac2}$ of the coil using two different types of wire materials having conductivity $\sigma_1$, $\sigma_2$, respectively, are equal, the resistance has been found to be equal to the sum of the DC resistances of those coils.

Consequently, in the electric wire 1 according to the first embodiment of the present invention and the coil using the same, by using the wire material having lower conductivity than copper, the radius a of the electric wire 1 is less than the skin depth, and the AC resistance of the electric wire 1 at the frequency used in the electric wire 1 or the coil, is provided in excess of a sum of the DC resistance of the electric wire 1 and the DC resistance of the copper wire having the same shape and the same outer diameter as the electric wire 1.

That is, when conductivity of the electric wire according to the first embodiment of the present invention is $\sigma_1$ [$\Omega^{-1}m^{-1}$], conductivity of the copper wire having the same shape and the same outer diameter as the electric wire 1 is $\sigma_2$ [$\Omega^{-1}m^{-1}$], coefficient representing an intensity of a magnetic field acting on the electric wire is $\alpha$ [$m^{-1}$], the circular constant is $\pi$, the radii of the electric wire 1 and the copper wire are a [m], magnetic permeability of vacuum is $\mu_0$ [H/m], a number of conductors constituting the electric wire 1 is N [number], and length of the conductor constituting the electric wire 1 is l [m], the AC resistance R [$\Omega$] of the electric wire 1 at the frequency used therein is defined to satisfy the following equation (17).

$$R \geq \left(\frac{1}{\sigma_1 \pi a^2} + \frac{1}{\sigma_2 \pi a^2}\right) \times \frac{l}{N} \quad (17)$$

The frequency f [kHz] of this case satisfies the following equation (18).

$$f \geq \sqrt{\frac{1}{\sigma_1 \sigma_2}} \frac{1}{\alpha \pi^2 a^3 \mu_0} \quad (18)$$

According to the electric wire 1 and the coil according to the first embodiment of the present invention, the AC resistance can be equal to or less than the copper wire having the same shape and the same outer diameter as the electric wire at the frequency used in the electric wire 1 and the coil. Furthermore, since it is possible to provide the AC resistance at the frequency used in the electric wire 1 and the coil by using the DC resistance of the electric wire and the DC resistance of the copper wire having the same shape and the same outer diameter as the electric wire, the electric wire and the coil can be more easily designed.

EXAMPLE

Figure 4:
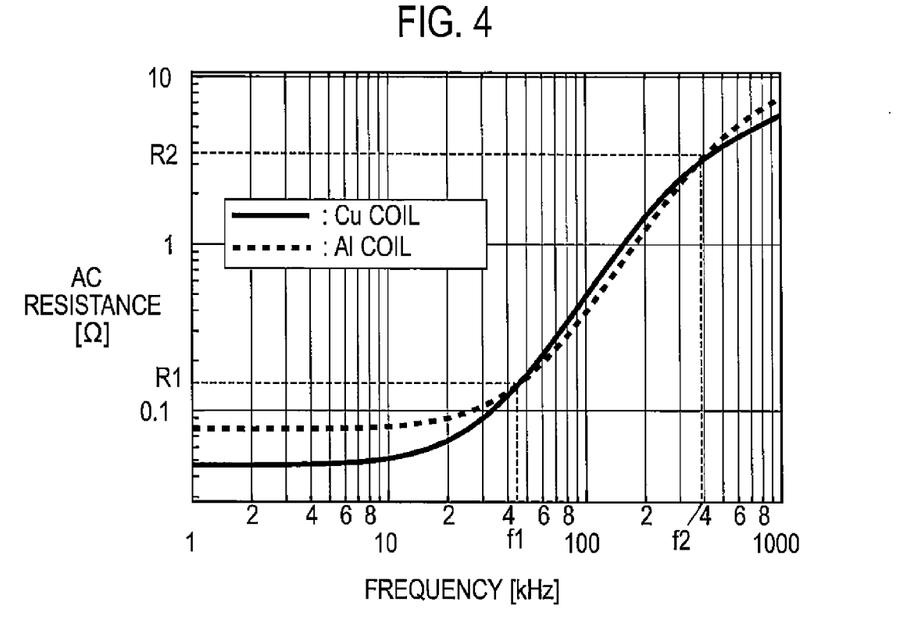
FIG. 4 is a graph presenting an example of calculated values of a relation between a frequency and an AC resistance of the electric wire according to the first embodiment of the present invention.
Figure 5:
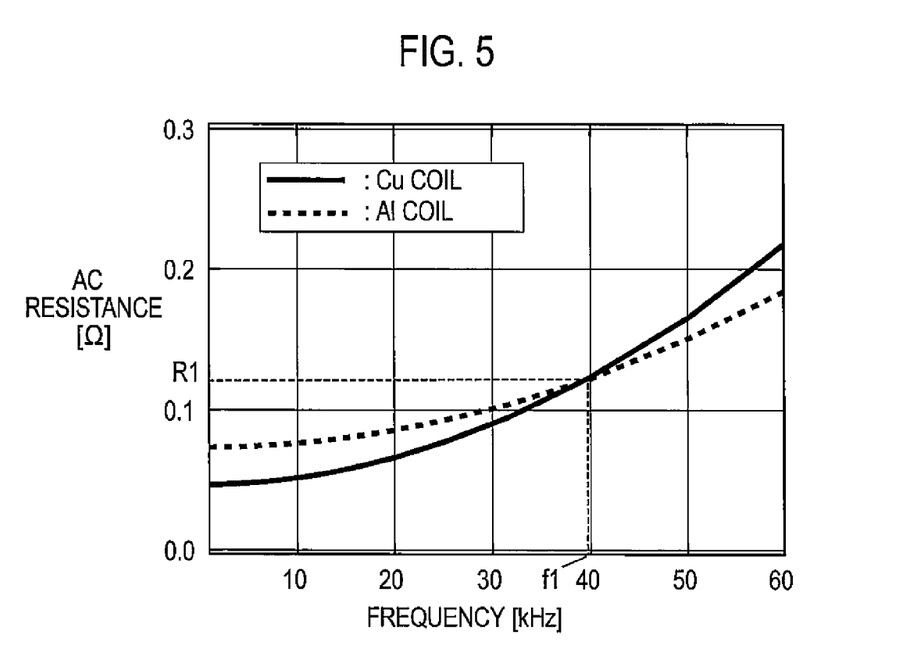
FIG. 5 is a partially enlarged graph of FIG. 4.

FIGS. 4 and 5 show calculated results of the AC resistances of coils using equations (2) to (5) and (9), where each coil is wound 42 turns to the bobbin having an inner diameter of 20.0 mm by twisted nine enameled wires made of copper or aluminum each having an outer diameter of 0.4 mm and a finished diameter of 0.43 mm.

Here, calculation has been done with the conductivity of copper as $5.80 \times 10^4$ $\Omega^{-1}mm^{-1}$ and the conductivity of aluminum as $3.70 \times 10^4$ $\Omega^{-1}mm^{-1}$. In addition, the value of $\alpha$ has been obtained as 5.6 $mm^{-1}$.

From FIGS. 4 and 5, it can be seen that the DC resistance of the aluminum coil (hereinafter, also referred to as "Al coil") is larger than the copper coil (hereinafter, also referred to as "Cu coil"). Further, it can be seen that the AC resistance of the Al coil is smaller than the AC resistance of the Cu coil in a specific frequency region from the frequency $f_1$ to the frequency $f_2$ which is higher than the frequency $f_1$.

That is, in a frequency lower than the frequency $f_1$, the AC resistance of the Al coil is larger than the AC resistance of the Cu coil. The AC resistances of the Al coil and the Cu coil is consistent with $R_1$ at the frequency $f_1$. Since the proximity effect loss is dominant in the specific frequency range from the frequency $f_1$ to the frequency $f_2$, the magnitude relation of the AC resistances is reversed. The AC resistance of the Al coil and the Cu coil is consistent with $R_2$ at the frequency $f_2$. In a frequency higher than the frequency $f_2$, the AC resistance of the Al coil is greater than the AC resistance of the Cu coil, since its proximity effect is greater than that of copper. In addition, the frequency $f_1$ is shifted more to the lower frequency side as the thicker the element wire diameter or the more the number of turns.

The frequency $f_1$ shown in FIG. 4 corresponds to the frequency $f_1$ of the above equation (15). In addition, by setting the radius a of the electric wire 1 according to the embodiment of the present invention to be smaller than the skin depth, the frequency f defined by the above equation (18) may be lower than the frequency $f_2$ of the high frequency side shown in FIG. 4. Therefore, because the frequency f is provided higher than the frequency $f_1$ and lower than the frequency $f_2$, it is possible to make the AC resistance equal to or less than the copper wire having the same shape and the same outer diameter as the electric wire.

Figure 6:
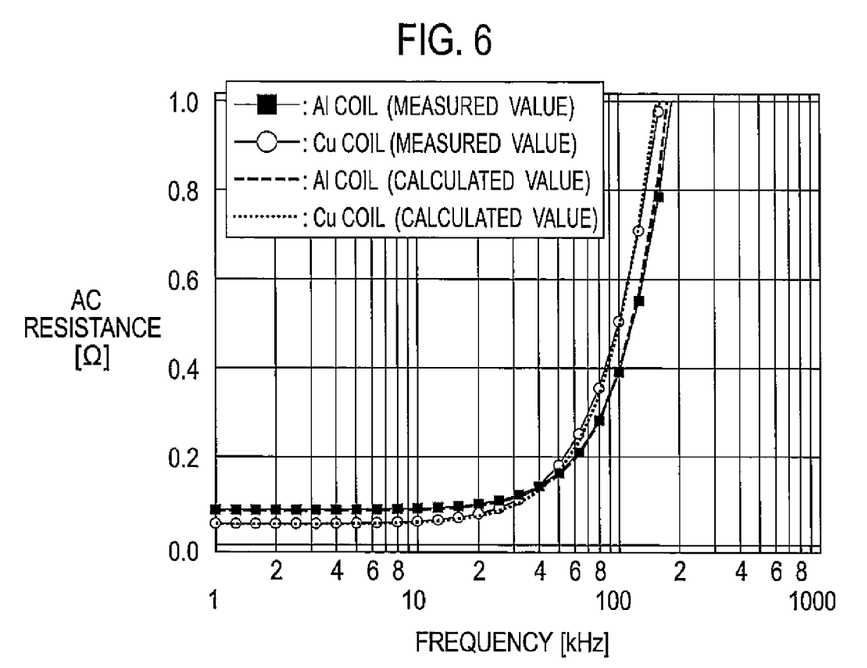
FIG. 6 is a graph presenting an example of calculated values and measured values of a relation between a frequency and an AC resistance of the electric wire according to the first embodiment of the present invention.
Figure 7:
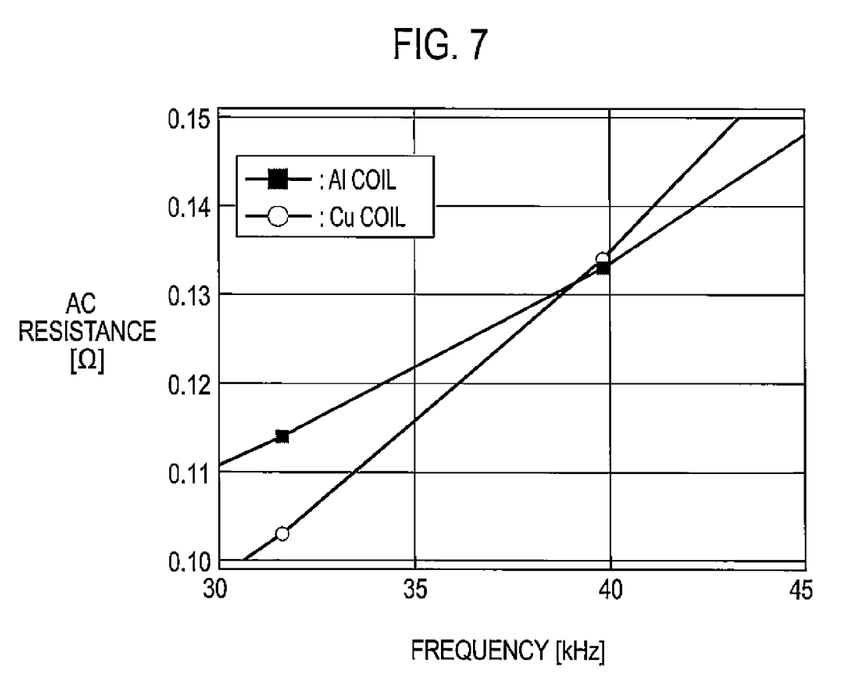
FIG. 7 is a partially enlarged graph of the measured values in FIG. 6.

Then, an Al coil and a Cu coil has been prepared with the same conditions as calculating the AC resistance of the Al coil and the Cu coil shown in FIGS. 4 and 5. That is, the Al coil and the Cu coil have been prepared so as to be wound 42 turns to the bobbin having an inner diameter of 20.0 mm by twisted nine enameled wires made of copper or aluminum each having an outer diameter of 0.4 mm and a finished diameter of 0.43 mm. The results of the AC resistances of the prepared Al and Cu coils measured with LCR meter is shown in FIGS. 6 and 7. In FIG. 6, the calculated values of the AC resistances of the Cu and Al coils by the equation (5) have been also presented. In this regard, the calculation has been performed with the conductivity of copper as $5.80 \times 10^4$ $\Omega^{-1}mm^{-1}$ and the conductivity of aluminum as $3.70 \times 10^4$ $\Omega^{-1}mm^{-1}$. Also, the shape factor $\alpha$ has been determined for both coils as $5.6$ $mm^{-1}$ from the comparison of the calculated value by equation (5) and the measured value.

The DC resistance of the Cu coil is 47.9 m$\Omega$ and the DC resistance of the Al coil is 79.4 m$\Omega$, and thus the DC resistance of the Cu coil is lower than the DC resistance of the Al coil. However, as shown in FIGS. 6 and 7, each AC resistance increases as the frequency increases, then the AC resistance of the Cu coil and the AC resistance of the Al coil is consistent at the certain frequency, and in the higher frequency side, the AC resistance of the Cu coil is higher than the AC resistance of the Al coil. The frequency when the AC resistance of the Al coil and the AC resistance of the Cu coil are consistent is 39 kHz, and the AC resistance in this case is 131 m$\Omega$. To this measured value, the AC resistance $R_1$ calculated by the sum of the DC resistances by the equation (16) is 127 m$\Omega$, and thus, it has been confirmed to be well consistent with the measured AC resistance. In addition, the frequency $f_1$ calculated by the equation (15) is 38.8 kHz, and thus, it has been confirmed to be well consistent with the measured frequency.

[Method for Designing Electric Wire and Coil]

As an example of a design method for the electric wire and the coil according to the first embodiment of the present invention, a wire material having the lower conductivity than copper is selected. Moreover, design will be performed so that the radius of the electric wire is smaller than the skin depth, and the AC resistance of the electric wire at the frequency used in the electric wire or the coil is a sum of the DC resistance of the electric wire and the DC resistance of the copper wire having the same shape and the same outer diameter as the electric wire.

According to the design method for the electric wire and the coil according to the first embodiment of the present invention, because it is possible to design based on the DC resistance of the electric wire and the DC resistance of the copper wire having the same shape and the same outer diameter as the electric wire, the electric wire and the coil in which the AC resistance can be equal to or less than the AC resistance of the copper wire having the same shape and the same outer diameter as the electric wire can be easily designed and manufactured. In addition, the design method for the electric wire and the coil described above, may be automatically performed by using hardware resources, such as a central processing unit (CPU), a storage device and the like.

Second Embodiment

Electric Wire and Coil

Figure 8:
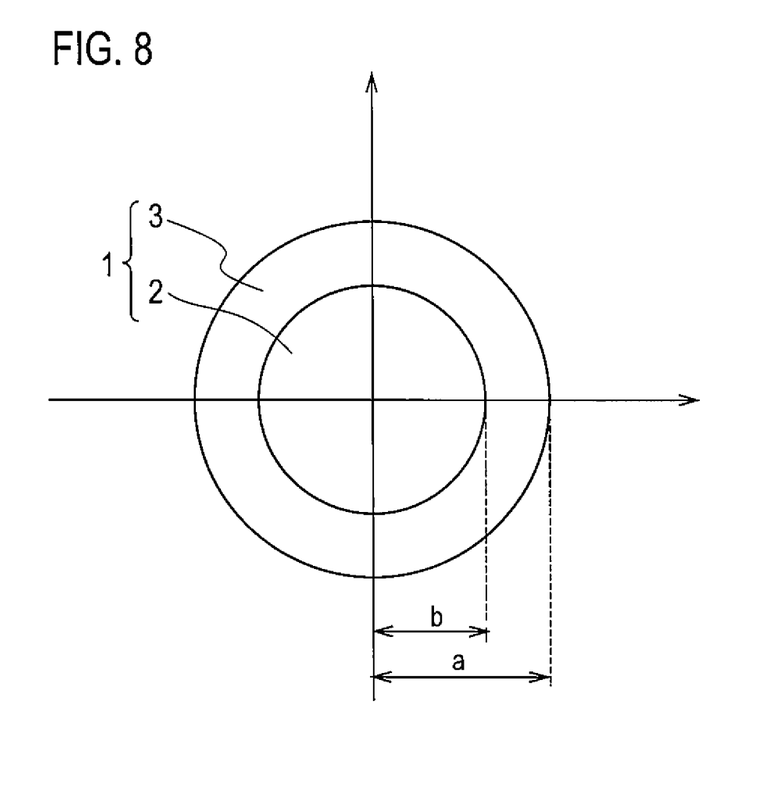
FIG. 8 is a cross-sectional view illustrating an example of an electric wire according to a second embodiment of the present invention.

An electric wire 1 according to a second embodiment of the present invention, as shown in FIG. 8, is a wire material having a double layered structure in which an inner layer (first layer) 2 and an outer layer (second layer) 3 around the periphery of the inner layer 2 are formed, and the inner layer 2 is made of a substance having lower conductivity than copper and the outer layer 3 is made of copper. Then, the electric wire 1 according to the second embodiment of the present invention has a radius a of the electric wire 1 which is smaller than the skin depth, and an AC resistance of the electric wire 1 at a frequency used in the electric wire 1 is provided in excess of a sum of a value obtained by multiplying a DC resistance value of the electric wire 1 by a ratio of a cross-sectional area of the inner layer 2 and a cross-sectional area of the entire electric wire 1, and a DC resistance value of the copper wire having the same shape and the same outer diameter as the electric wire 1.

The frequency used in the electric wire 1 according to the second embodiment of the present invention may be set as appropriate according to the specification of each product, and is not particularly limited. For example, it may be about 1 kHz to about 1 MHz, or about 10 kHz to about 100 kHz. In the case of the IH cooking device, it may be about 20 kHz to about 100 kHz. It may be about 50 Hz to about 60 Hz in the case of the product that directly uses the utility frequency in Japan, United State, Europe, China, and the like.

The diameter of the electric wire 1 according to the second embodiment of the present invention is preferably about 0.05 mm to about 0.6 mm, and is not particularly limited. For the electric wire 1 according to the second embodiment of the present invention, a copper clad aluminum (CCA) wire in which copper (Cu) as the outer layer 3 is uniformly coated on the outer circumference of an aluminum (Al) wire as the inner layer 2 may be used. A cross-sectional area of the copper layer as the outer layer 3 is greater than 0 and not more than 30% with respect to the cross-sectional area of the entire electric wire which includes the aluminum wire and the copper layer, preferably about 3% to about 15%, more preferably about 3% to about 10%, further more preferably about 3% to about 5%. As the ratio of the cross-sectional area of the copper layer to the entire electric wire is reduced, the AC resistance can be decreased. For the aluminum wire as the inner layer 2, for example, aluminum for electric use (EC aluminum) or aluminum alloy, such as Al—Mg—Si alloy (JIS6000 series), may be used.

For the material of the inner layer 2, in addition to the aluminum, various materials having low electrical conductivity than copper can be used, but a non-magnetic material is preferable. For example, the electric wire 1 may be a pipe of copper filling an insulator as the inner layer 2. For the insulator, a resin and air or the like may be used.

In the second embodiment of the present invention, it is also possible to apply the equations (1) to (11) described in the first embodiment of the present invention. In the second embodiment of the present invention, the DC resistance of the electric wire of the double layered structure, where the radius is a, the radius of the inner layer 2 is b, conductivity of the outer layer 3 is $\sigma_2$, and conductivity of the inner layer 2 is $\sigma_1$, can be expressed by the following equation (19). Also, according to Non-Patent Document 2, $P_L$ can be expressed by the following equation (20).

$$R_s = \frac{1}{\pi} \frac{1}{\sigma_2(a^2 - b^2) + \sigma_1 b^2} \quad (19)$$

$$P_L = \frac{\pi(\omega\mu_0 H_i)^2}{8}[\sigma_2(a^4 - b^4) + \sigma_1 b^4] \quad (20)$$

Therefore, the high frequency resistance $R_{ac1}$ of the coil using the wire material having the double layered structure where the radius is a, the radius of the inner layer 2 is b, conductivity of the outer layer 3 is $\sigma_2$, and conductivity of the inner layer 2 is $\sigma_1$, and the high frequency resistance $R_{ac2}$ of the coil using the wire material where the radius in a, and conductivity is $\sigma_2$, can be expressed by the following equations (21) and (22), respectively.

$$R_{ac1} = \frac{1}{\pi} \frac{1}{\sigma_2(a^2 - b^2) + \sigma_1 b^2} + \alpha^2 \frac{\pi(\omega\mu_0)^2}{4} [\sigma_2(a^4 - b^4) + \sigma_1 b^4] \quad (21)$$

$$R_{ac2} = \frac{1}{\pi} \frac{1}{\sigma_2 a^2} + \alpha^2 \frac{\pi(\omega\mu_0)^2}{4} \sigma_2 a^4 \quad (22)$$

Here, assuming that the values of $R_{ac1}$ and $R_{ac2}$ are equal, the following equation (23) can be obtained.

$$R_{ac1} - R_{ac2} = \frac{1}{\pi} \frac{1}{\sigma_2(a^2 - b^2) + \sigma_1 b^2} - \frac{1}{\pi} \frac{1}{\sigma_2 a^2} + \quad (23)$$
$$\alpha^2 \frac{\pi(\omega\mu_0)^2}{4} [\sigma_2(a^4 - b^4) + \sigma_1 b^4] -$$
$$\alpha^2 \frac{\pi(\omega\mu_0)^2}{4} \sigma_2 a^4$$
$$= 0$$

In this case, the frequency $f_1$ and the high frequency resistance $R_1$ can be expressed by the following equations (24) and (25), respectively.

$$f_1 = \frac{1}{\pi^2 \alpha \mu_0 ab} \sqrt{\frac{1}{\sigma_2[\sigma_2(a^2 - b^2) + \sigma_1 b^2]}} \quad (24)$$

$$R_1 = \left( \frac{1}{\sigma_2 \pi a^2} + \frac{a^2}{b^2} \frac{1}{\pi} \frac{1}{\sigma_2(a^2 - b^2) + \sigma_1 b^2} \right) \times \frac{l}{N} \quad (25)$$

Thus, when the high frequency resistances $R_{ac1}$ and $R_{ac2}$ of the coils using the two different wire materials that are the wire material having the double layered structure in which the radius is a, the radius of the inner layer 2 is b, conductivity of the outer layer 3 is $\sigma_2$ and conductivity of the inner layer 2 is $\sigma_1$, and the wire material in which the radius is a and conductivity is $\sigma_2$, respectively, are equal, it has been found that the resistance value is equal to the sum of the value obtained by multiplying a DC resistance value of the wire material of the double layered structure by the ratio of the cross-sectional area of the inner layer 2 and the cross-sectional area of the entire wire material, and the DC resistance value of the copper wire having the same shape and the same outer diameter as the electric wire.

Here, for an example of the electric wire according to the second embodiment of the present invention, the electric wire made of a uniform material may be represented as a case in which the radius b of the inner layer 2 is equal to the radius a of the entire electric wire. That is, the following equation (26) and (27) may be applied, and those are the same as the equations (15) and (16) for the frequency $f_1$, and the high frequency resistance $R_1$ of the electric wire 1 in the case of the single layered structure according to the first embodiment of the present invention.

$$f_1 = \frac{1}{\pi^2 \alpha \mu_0 a^3} \sqrt{\frac{1}{\sigma_1 \sigma_2}} \quad (26)$$

$$R_1 = \left( \frac{1}{\sigma_1 \pi a^2} + \frac{1}{\sigma_2 \pi a^2} \right) \times \frac{l}{N} \quad (27)$$

Thus, when the high frequency resistances $R_{ac1}$ and $R_{ac2}$ of the coils using the two different wire materials having the radius a and conductivity $\sigma_1$, and having the radius a and conductivity $\sigma_2$ are equal, it has been found that the resistance value $R_1$ is equal to the sum of the DC resistances of these wires.

Consequently, in the electric wire 1 and the coil using the same according to the second embodiment of the present invention, the wire material having the double layered structure in which the outer layer 3 is copper and the inner layer 2 has lower conductivity than copper is used, and the radius a of the electric wire 1 is smaller than the skin depth and the AC resistance of the electric wire 1 at the frequency used in the electric wire 1 or the coil is provided in excess of the sum of the value obtained by multiplying the DC resistance value of the electric wire 1 by the ratio of the cross-sectional area of the inner layer 2 and the cross-sectional area of the entire electric wire 1, and the DC resistance value of the copper wire having the same shape and the same outer diameter as the electric wire 1. However, the thickness of the outer layer 3 of the electric wire 1 may be equal to 0, in which case the ratio of the cross-sectional area of the entire electric wire 1 and the cross-sectional area of the inner layer 2 is equal to 1.

In other words, when the conductivity of the inner layer 2 of the electric wire 1 having the double layered structure is $\sigma_1$ [$\Omega^{-1}$m$^{-1}$], the conductivity of the copper is $\sigma_2$ [$\Omega^{-1}$m$^{-1}$], the coefficient representing the intensity of the magnetic field acting on the electric wire 1 is $\alpha$ [m$^{-1}$], the circular constant is $\pi$, the radius of the inner layer is b [m], the radius of the electric wire 1 is a [m], the magnetic permeability of vacuum is $\mu_0$ [H/m], a number of conductors constituting the electric wire 1 is N [number], and the length of the conductor constituting the electric wire 1 is l [m], the AC resistance R [$\Omega$] of the electric wire 1 at the frequency used therein is defined so as to satisfy the following equation (28).

$$R \geq \left( \frac{1}{\sigma_2 \pi a^2} + \frac{a^2}{b^2} \frac{1}{\pi} \frac{1}{\sigma_2(a^2 - b^2) + \sigma_1 b^2} \right) \times \frac{l}{N} \quad (28)$$

The frequency f [kHz] in this case satisfies the following equation (29).

$$f \geq \frac{1}{\pi^2 \alpha \mu_0 ab} \sqrt{\frac{1}{\sigma_2[\sigma_2(a^2 - b^2) + \sigma_1 b^2]}} \quad (29)$$

According to the electric wire 1 and the coil according to the second embodiment of the present invention, the AC resistance can be equal to or less than the copper wire having the same shape and the same outer diameter as the electric wire at the frequency used in the electric wire 1 and the coil. Furthermore, since the AC resistance at the frequency used in the electric wire 1 and the coil can be provided by using the DC resistance of the electric wire and the DC resistance of the copper wire having the same shape and the same outer diameter as the electric wire, the electric wire and the coil can be more easily designed.

EXAMPLE

Figure 9:
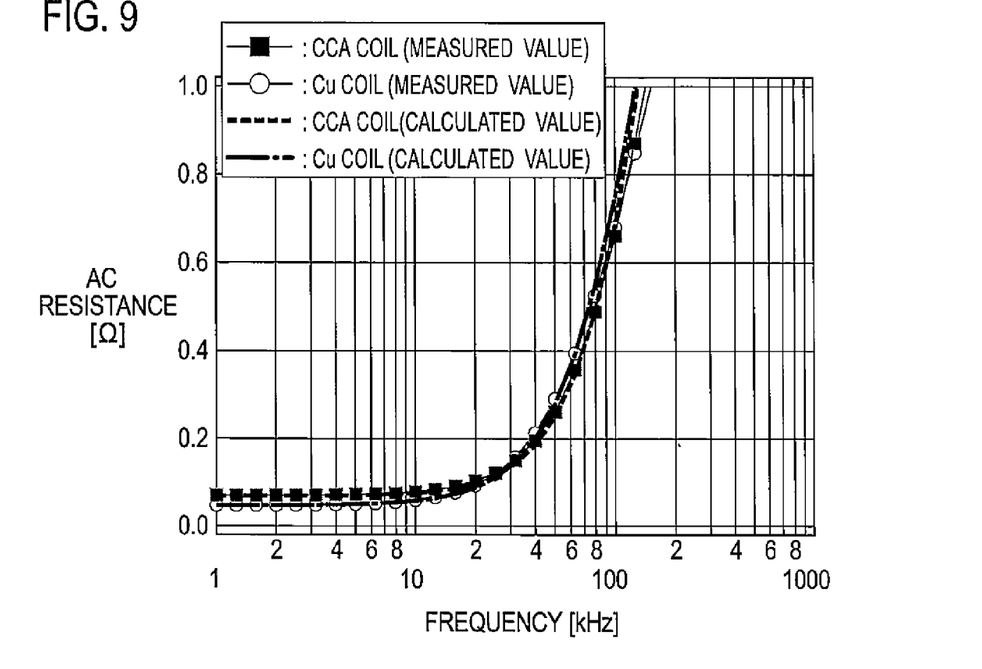
FIG. 9 is a graph presenting an example of calculated values and measured values of a relation between a frequency and an AC resistance of the electric wire according to the second embodiment of the present invention.
Figure 10:
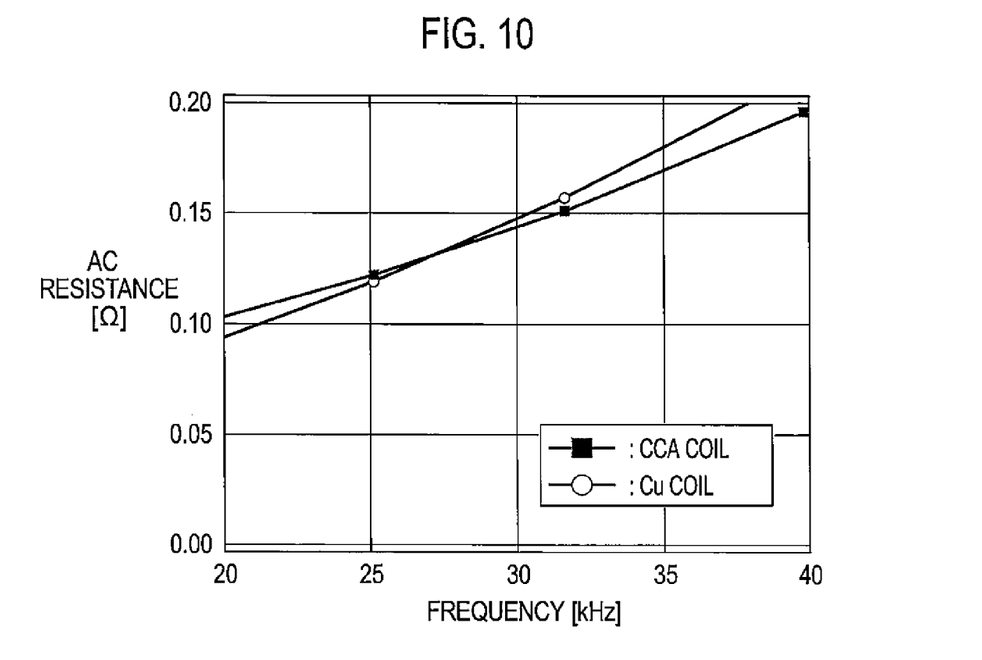
FIG. 10 is a partially enlarged graph of the measured values in FIG. 9.

The results of the AC resistances of the coils wound 42 turns to the bobbin having an inner diameter of 20.0 mm by twisted four enameled wires made of copper or CCA each having an outer diameter of 0.6 mm and a finished diameter of 0.63 mm, measured with LCR meter is shown in FIGS. 9 and 10. In FIG. 9, the calculated resistance values of the copper wire coil (hereinafter, also referred to as "Cu coil") and the CCA wire coil (hereinafter, also referred to as "CCA coil") by the above equation (5) are also shown. Here, calculation has been done with the conductivity of copper as $5.80 \times 10^4$ $\Omega^{-1}mm^{-1}$ and the conductivity of aluminum as $3.70 \times 10^4$ $\Omega^{-1}mm^{-1}$. In addition, the shape factor $\alpha$ has been obtained as 2.4 $mm^{-1}$ by comparison of the calculated value from the equation (5) and the measured value.

The DC resistance of the Cu coil is 47.4 m$\Omega$, the DC resistance of CCA coil is 69.9 m$\Omega$, and thus, the DC resistance of the Cu coil is lower than the DC resistance of the CCA coil. However, as shown in FIGS. 9 and 10, each AC resistance increases as the frequency increases, then the AC resistance of the Cu coil and the AC resistance of the CCA coil is consistent at the certain frequency, and in the higher frequency side, the AC resistance of the Cu coil is higher than the AC resistance of the CCA coil. In addition, the frequency at which the AC resistance of the CCA coil and the AC resistance of the Cu coil are consistent is 27.3 kHz, and the AC resistance is 131 m$\Omega$. To those measured values, the AC resistance $R_1$ calculated by the sum of the DC resistance by the equation (27) is 130 m$\Omega$, and thus, it has been confirmed to be well consistent with the measured AC resistance. In addition, the frequency $f_1$ calculated by the equation (26) is 28.0 kHz, and thus, it has been confirmed to be well consistent with the measured frequency.

(Designing Method of Electric Wire and Coil)

As an example of a design method for the electric wire and the coil according to the second embodiment of the present invention, a wire material having the outer layer 3 of copper and the inner layer 2 of the substance having lower conductivity than copper is selected. Moreover, design will be performed so that the radius of the electric wire 1 is smaller than the skin depth, and the AC resistance of the electric wire 1 at the frequency used in the electric wire 1 or the coil is the sum of the value obtained by multiplying the DC resistance value of the electric wire 1 by the ratio of the cross-sectional area of the inner layer 2 and the cross-sectional area of the entire electric wire 1, and the DC resistance of the copper wire having the same shape and the same outer diameter as the electric wire 1.

According to the design method for the electric wire and the coil according to the second embodiment of the present invention, because it is possible to design based on the DC resistance of the electric wire 1, the radius of the outer layer 3 and the radius of the inner layer 2, and the DC resistance of the copper wire having the same shape and the same outer diameter as the electric wire 1, the electric wire 1 and the coil in which the AC resistance can be equal to or less than the AC resistance of the copper wire having the same shape and the same outer diameter as the electric wire 1 can be easily designed and manufactured. In addition, the design method for the electric wire 1 and the coil described above, may be automatically performed by using hardware resources, such as a central processing unit (CPU), a storage device and the like.

Other Embodiment

The present invention has been described through the first and second embodiments as mentioned above. However the descriptions and drawings that constitute a portion of this disclosure should not be perceived as limiting this invention. Various alternative embodiments and operational techniques will become clear to persons skilled in the art from this disclosure.

The electric wire according to the present invention may be applied to an electronics industry including a manufacturing industry of a variety of devices, such as high frequency transformers, motors, reactors, choke coils, induction heating devices, magnetic heads, high frequency power supply cables, DC power supply units, switching power supplies, AC adapters, displacement sensors and flaw detection sensors using eddy current detection, IH cooking heaters, non-contact power feeding devices, high-frequency current generators, and the like.

In this manner, the present invention naturally includes various embodiments not specifically mentioned herein. Accordingly, the technical scope of the present invention may be limited only by the inventive features set forth by the scope of the patent claims deemed reasonable from the above description.

EXPLANATION OF REFERENCE

1 . . . electric wire
2 . . . inner layer
3 . . . outer layer

The invention claimed is:

1. An electric wire in a single layered structure having a first layer of a substance having lower conductivity than copper, wherein
a radius of the electric wire is less than a skin depth,
an alternating current resistance value of the electric wire at a frequency used in the electric wire is greater than or equal to a sum of a direct current resistance value of the electric wire and a direct current resistance value of a copper wire having a same shape and a same outer diameter as the electric wire, and less than or equal to an alternating current resistance value of the copper wire,
the frequency f used in the electric wire is defined to satisfy:

$$f \geq \sqrt{\frac{1}{\sigma_1 \sigma_2} \frac{1}{\alpha \pi^2 a^3 \mu_0}},$$

and the alternating current resistance R of the electric wire at the frequency used in the electric wire defined to satisfy:

$$R \geq \left(\frac{1}{\sigma_1 \pi a^2} + \frac{1}{\sigma_2 \pi a^2}\right) \times \frac{l}{N},$$

where conductivity of the electric wire is $\sigma_1$, conductivity of the copper wire is $\sigma_2$, coefficient representing an intensity of a magnetic field acting on the electric wire is $\alpha$, the circular constant is $\pi$, radii of the electric wire and the copper wire are a, magnetic permeability of vacuum is $\mu_0$, a number of conductors making up the electric wire is N, and a length of the conductors making up the electric wire is l.

2. An electric wire in a double layered structure in which a second layer of copper is formed on a periphery of a first layer of a substance having lower conductivity than copper, wherein
   a radius of the electric wire is less than a skin depth,
   an alternating current resistance value of the electric wire at a frequency used in the electric wire is greater than or equal to a sum of a value obtained by multiplying a direct current resistance value of the electric wire by a ratio of a cross-sectional area of the first layer and a cross-sectional area of the entire electric wire, and a direct current resistance value of a copper wire having a same shape and a same outer diameter as the electric wire, and less than or equal to an alternating current resistance value of the copper wire,
   the electric wire has the double layered structure, the frequency f used in the electric wire is defined to satisfy:

$$f \geq \frac{1}{\pi^2 \alpha \mu_0 ab} \sqrt{\frac{1}{\sigma_2[\sigma_2(a^2 - b^2) + \sigma_1 b^2]}},$$

and the alternating current resistance R of the electric wire at the frequency used in the electric wire is defined to satisfy:

$$R \geq \left( \frac{1}{\sigma_2 \pi a^2} + \frac{a^2}{b^2} \frac{1}{\pi} \frac{1}{\sigma_2(a^2 - b^2) + \sigma_1 b^2} \right) \times \frac{l}{N},$$

where conductivity of the first layer is $\sigma_1$, conductivity of the copper wire is $\sigma_2$, coefficient representing an intensity of a magnetic field acting on the electric wire is $\alpha$, the circular constant is $\pi$, a radius of the first layer is b, a radius of the electric wire is a, magnetic permeability of vacuum is $\mu_0$, a number of conductors making up the electric wire is N, and a length of the conductors making up the electric wire is l.

3. A coil using the electric wire of claim 1.
4. A coil using the electric wire of claim 2.
5. A method for manufacturing an electric wire, comprising:
   using a wire material in a single layered structure having a first layer of a substance having lower conductivity than copper;
   manufacturing the electric wire such that a radius of the electric wire is less than a skin depth, and an alternating current resistance value of the electric wire at a frequency used in the electric wire is greater than or equal to a sum of a direct current resistance value of the electric wire and a direct current resistance value of a copper wire having a same shape and a same outer diameter as the electric wire, and less than or equal to an alternating current resistance value of the copper wire;
   the frequency f used in the electric wire is defined to satisfy:

$$f \geq \sqrt{\frac{1}{\sigma_1 \sigma_2}} \frac{1}{\alpha \pi^2 a^3 \mu_0},$$

and the alternating current resistance R of the electric wire at the frequency used in the electric wire is defined to satisfy:

$$R \geq \left( \frac{1}{\sigma_1 \pi a^2} + \frac{1}{\sigma_2 \pi a^2} \right) \times \frac{l}{N},$$

where conductivity of the electric wire is $\sigma_1$, conductivity of the copper wire is $\sigma_2$, coefficient representing an intensity of a magnetic field acting on the electric wire is $\alpha$, the circular constant is $\pi$, radii of the electric wire and the copper wire are a, magnetic permeability of vacuum is $\mu_0$, a number of conductors making up the electric wire is N, and a length of the conductors making up the electric wire is l.

6. A method for manufacturing an electric wire, comprising:
   using a wire material in a double layered structure in which a second layer of copper is formed on a periphery of a first layer of a substance having lower conductivity than copper;
   manufacturing the electric wire such that a radius of the electric wire is less than a skin depth, and an alternating current resistance value of the electric wire at a frequency used in the electric wire is greater than or equal to a sum of a value obtained by multiplying a direct current resistance value of the electric wire by a ratio of a cross-sectional area of the first layer and a cross-sectional area of the entire electric wire, and a direct current resistance value of a copper wire having a same shape and a same outer diameter as the electric wire, and less than or equal to an alternating current resistance value of the copper wire,
   the frequency f used in the electric wire is defined to satisfy:

$$f \geq \frac{1}{\pi^2 \alpha \mu_0 ab} \sqrt{\frac{1}{\sigma_2[\sigma_2(a^2 - b^2) + \sigma_1 b^2]}},$$

and the alternating current resistance R of the electric wire at the frequency used in the electric wire is defined to satisfy:

$$R \geq \left( \frac{1}{\sigma_2 \pi a^2} + \frac{a^2}{b^2} \frac{1}{\pi} \frac{1}{\sigma_2(a^2 - b^2) + \sigma_1 b^2} \right) \times \frac{l}{N},$$

where conductivity of the first layer is $\sigma_1$, conductivity of the copper wire is $\sigma_2$, coefficient representing an intensity of a magnetic field acting on the electric wire is $\alpha$, the circular constant is $\pi$, a radius of the first layer is b, a radius of the electric wire is a, magnetic permeability of vacuum is $\mu_0$, a number of conductors making up the electric wire is N, and a length of the conductors making up the electric wire is l.

* * * * *